July 21, 1931.    A. F. MASURY ET AL    1,815,441
DRIVE FOR MOTOR VEHICLES
Filed June 17, 1926
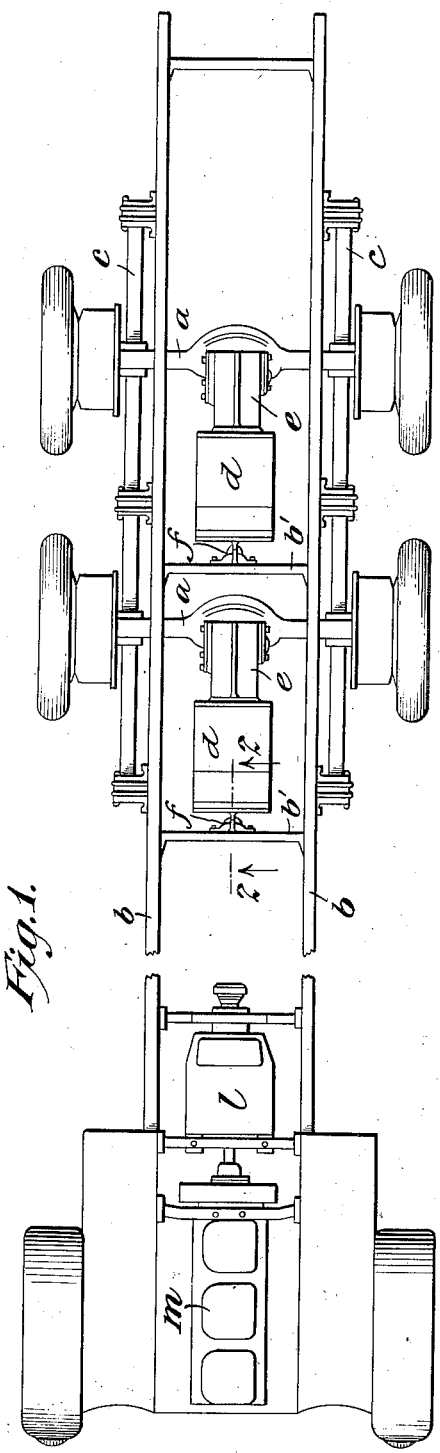
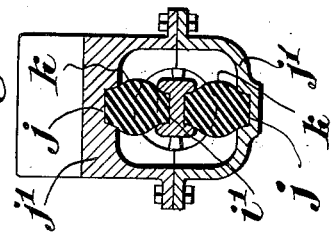
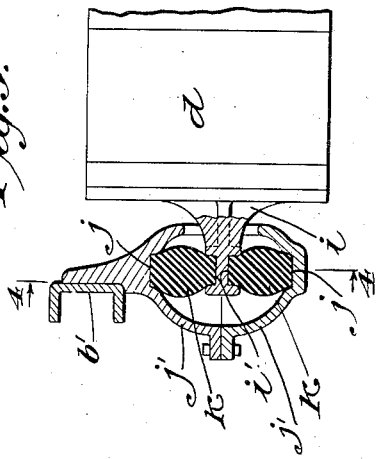
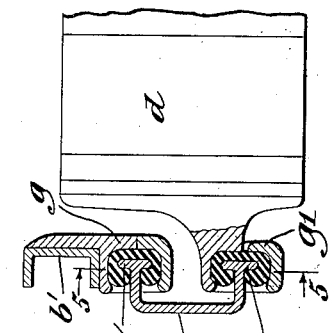
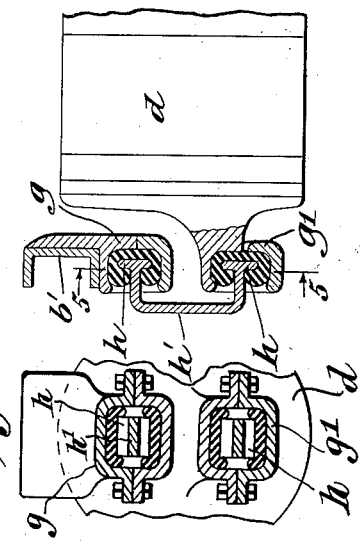
Inventors
Alfred F. Masury
Frank E. Queeney
By their Attorneys
Redding, Greeley, O'Shea & Campbell Patented July 21, 1931

1,815,441

UNITED STATES PATENT OFFICE

ALFRED F. MASURY, OF NEW YORK, N. Y., AND FRANK E. QUEENEY, OF TEANECK, NEW JERSEY, ASSIGNORS TO INTERNATIONAL MOTOR COMPANY, OF NEW YORK, N. Y., A CORPORATION OF DELAWARE

DRIVE FOR MOTOR VEHICLES

Application filed June 17, 1926. Serial No. 116,517.

This invention relates to self-propelled vehicles of the kind in which an electric motor is availed of to drive the propelling wheels and the electric current for the motor is supplied by a generator driven by an internal combustion engine. More particularly the invention relates to vehicles equipped with what is known as a dual rear axle drive, i. e. a pair of proximate driving axles. A motor is provided for each axle which has differential gearing and, if desired, reducing gearing of any convenient character associated therewith. One object of the present invention is to so associate the motor casing and the gear housing as to provide a simple and convenient unit from the standpoint of manufacture and assembly and in the interest of a reduction of space and a reduction in the distance through which the driving power must be transmitted. Accordingly the motor housing is secured directly to the gear casing forming a part of the axle housing. The invention also seeks to provide for the transmission of driving forces from the axle to the frame in situations where a Hotchkiss drive is not availed of. The composite motor and gear housing lends itself admirably to this end. It is therefore connected to the frame solely at one point, at its forward end, the weight being principally borne by the axle. A further aspect of the invention contemplates the provision for universal movement in the connection between the frame and housing to compensate for the movements of the axle over irregularities in the roadbed and inequalities in the load. Broadly this is attained by a universal joint connecting the end of the motor housing with the frame. Preferably this joint involves yielding non-metallic material because of its shock insulating properties and the connection is so constructed as to resist all torsion of the housing in a yielding manner.

The invention will now be described more fully with reference to the accompanying drawings illustrating preferred embodiments thereof, in which:

Figure 1 is a view, showing, in plan, the chassis of a motor vehicle having dual rear axles which are driven by motors through the housings of which the driving forces are transmitted to the frame.

Figures 2 and 3 are fragmentary views showing forms of connections between the motor housing and the frame which afford a degree of universal movement.

Figure 4 is a view in section, taken on line 4—4 of Figure 3, and looking in the direction of the arrows.

Figure 5 is a view in section, taken on line 5—5 of Figure 2, and looking in the direction of the arrows.

While the invention has been illustrated as applied to a motor vehicle having dual axles, each of which is driven by an electric motor, it is not limited to such in its broadest aspects, but is equally applicable to a single driving axle. The live axle sections are, as usual, adapted to turn within dead axle housings $a$ supporting the chassis frame $b$ through any convenient type of spring suspension $c$. They are driven by electric motors contained within the housings $d$ and the operative connections between the motors and the axles may include reducing gearing as well as the usual differential gearing disposed within the housings $e$. As will be apparent from an inspection of Figure 1 practically no propeller shafting is required with the construction described since the motors are practically adjacent the gearing and the composite housing structure described affords convenient transmission of the driving forces between the axles and the frame. As the weight may be borne principally by the axles it is merely required that a connection $f$ be provided between the forward ends of the motor housings $d$ and transverse frame members $b'$ to transmit the forces. Connections $f$ preferably allow a degree of universal movement as the relative elevations of the wheels and the relative distance between the axles and frame change constantly due to inequalities in the roadway and variations in loading. Any type of universal joint may be availed of. However, it is preferred to incorporate a yielding non-metallic material because of its shock insulating characteristics. In Figure 2, forwardly facing sectional housings $g$ and $g'$ are shown carried by, the respective frame members b' and motor housings d within which yielding non-metallic material, may be retained, engaging the enlarged ends h of a link member h'. In Figure 3 the motor housing d is shown as carrying an arm i formed with opposed seats i' for a block or blocks k of yielding non-metallic material disposed within seats j in a two part housing j' carried with the frame member b'. Rubber may be availed of as the yielding non-metallic material and it is preferably retained under compression to increase its strength, resiliency and wearing qualities.

The motors d receive electric current through electric conductors, not shown, from the generator l driven by the internal combustion engine m as is usual in this type of vehicle.

It will thus be seen that an electrically driven vehicle, having a dual rear axle drive, has been provided in which composite housings for the motors and driving connections are utilized to transmit the driving forces from the axles to the frame with complete compensation for relative movements of the axles and cushioning of the shocks impressed thereon.

Various modifications in the frame connection and driving connections will occur to those skilled in the art and are to be deemed within the scope of the appended claim.

What we claim is:

In a vehicle having a transverse frame member and an axle housing, in combination with a motor having its axis substantially perpendicular to said axle housing and having one of its ends secured rigidly thereto, means to support the other end of the motor on said transverse frame member comprising an arm carried rigidly with the motor and having oppositely facing substantially horizontal seats and opposed substantially vertical transverse seats formed thereon, a housing secured to the transverse frame member and having an opening therein, the housing and vertical seats on the arm forming housings, a U-shaped arm having, at its ends, transverse bearing members formed thereon, the ends of said U-shaped arm being received within the aforesaid housings, seats formed on the interior of the housing carried upon the frame and in opposition to the bearing surfaces on the cooperating end of the arm, and yielding non-metallic material between the seats on the arm and the seats of the respective housings.

This specification signed this 12th day of June A. D. 1926.

ALFRED F. MASURY.
FRANK E. QUEENEY.